(12) United States Patent
Wei et al.

(10) Patent No.: US 9,990,048 B2
(45) Date of Patent: Jun. 5, 2018

(54) INTERACTION METHOD BETWEEN PIECES OF EQUIPMENT AND USER EQUIPMENT

(71) Applicant: Beijing Zhigu Rui Tuo Tech Co., Ltd, Beijing (CN)

(72) Inventors: Na Wei, Beijing (CN); Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 8 days.

(21) Appl. No.: 15/185,002

(22) Filed: Jun. 16, 2016

(65) Prior Publication Data

US 2016/0370869 A1    Dec. 22, 2016

(30) Foreign Application Priority Data

Jun. 17, 2015    (CN) .............................. 2015 1 033655

(51) Int. Cl.
*G06F 3/01* (2006.01)
*G06F 3/03* (2006.01)
*G06F 3/0346* (2013.01)
*G06K 9/00* (2006.01)

(52) U.S. Cl.
CPC .............. *G06F 3/017* (2013.01); *G06F 3/012* (2013.01); *G06F 3/013* (2013.01); *G06F 3/014* (2013.01); *G06F 3/0346* (2013.01); *G06K 9/00335* (2013.01); *G06K 9/00597* (2013.01)

(58) Field of Classification Search
CPC ............ G06K 9/00597; G06K 9/00335; G06F 3/017; G06F 3/0346; G06F 3/014; G06F 3/012; G06F 3/013
See application file for complete search history.

(56) References Cited

U.S. PATENT DOCUMENTS

| 8,854,433 | B1 | 10/2014 | Rafii | |
| 2005/0052427 | A1* | 3/2005 | Wu | G06F 3/04883 345/173 |
| 2009/0303204 | A1 | 12/2009 | Nasiri et al. | |
| 2011/0175932 | A1* | 7/2011 | Yu | G06F 3/013 345/661 |

(Continued)

FOREIGN PATENT DOCUMENTS

CN            104199546 A        12/2014

OTHER PUBLICATIONS

Office Action dated Aug. 23, 2017 for U.S. Appl. No. 15/184,995, 21 pages.

(Continued)

*Primary Examiner* — Ariel Balaoing
(74) *Attorney, Agent, or Firm* — Amin, Turocy & Watson, LLP

(57) ABSTRACT

An interaction method between pieces of equipment and user equipment. A method comprises: obtaining first motion information of another piece of user equipment by one piece of user equipment, obtaining second motion information of at least one eye of a user from near-to-eye equipment, and executing an interaction operation with the near-to-eye equipment and/or another piece of user equipment in response to the first motion information matching with the second motion information. A natural, portable and safe interaction method is provided between pieces of equipment.

20 Claims, 6 Drawing Sheets

(56) References Cited

U.S. PATENT DOCUMENTS

| | | |
|---|---|---|
| 2012/0257035 A1 | 10/2012 | Larsen |
| 2013/0141325 A1 | 6/2013 | Bailey |
| 2013/0342672 A1 | 12/2013 | Gray et al. |
| 2014/0309867 A1* | 10/2014 | Ricci ............... H04W 48/04 701/36 |
| 2015/0370336 A1* | 12/2015 | Kauffmann ......... G06F 3/017 345/156 |

OTHER PUBLICATIONS

Office Action dated Aug. 24, 2017 for U.S. Appl. No. 15/184,999, 21 pages.

* cited by examiner

INTERACTION METHOD BETWEEN PIECES OF EQUIPMENT AND USER EQUIPMENT

RELATED APPLICATION

The present application claims the benefit of priority to Chinese Patent Application No. 201510336550.5, filed on Jun. 17, 2015, and entitled "Interaction Method between Pieces of Equipment and User Equipment", which application is hereby incorporated into the present application by reference in its entirety.

TECHNICAL FIELD

The present application relates to the technical field of interaction between pieces of equipment, and, for example, to an interaction method between pieces of equipment and user equipment.

RELATED ART

Along with continuous increase of variety of user equipment and continuous enhancing of functions, more convenience is brought in life and study of a user. On such base, the user hopes that the operation on the user equipment is simpler and more convenient, particularly, when interacting with other pieces of equipment by the user equipment, the user hopes that such interaction is automatically performed in a natural and safe manner, and the user is disturbed as little as possible.

SUMMARY

An example, non-limiting object of embodiments of the present application is to provide an interaction solution between pieces of equipment.

On a first aspect, an example embodiment of the present application provides an interaction method, comprising:

obtaining first motion information of another piece of user equipment by one piece of user equipment;

obtaining, by the user equipment, second motion information of at least one eye of a user from near-to-eye equipment; and executing, by the user equipment, an interaction operation with the near-to-eye equipment and/or the other piece of user equipment in response to the first motion information matching with the second motion information.

On a second aspect, an example embodiment of the present application provides user equipment, comprising:

a first information obtaining module, configured for obtaining first motion information of another piece of user equipment;

a second information obtaining module, configured for obtaining second motion information of at least one eye of a user from near-to-eye equipment; and an executing module, configured for executing an interaction operation with the near-to-eye equipment and/or the other piece of user equipment in response to the first motion information matching with the second motion information.

On a third aspect, an example embodiment of the present application provides user equipment, comprising:

a memory, configured for storing a command;

a processor, configured for executing the command of the memory, wherein the command enables the processor to execute following operations:

obtaining first motion information of another piece of user equipment;

obtaining second motion information of at least one eye of a user from near-to-eye equipment; and executing an interaction operation with the near-to-eye equipment and/or the other piece of user equipment in response to the first motion information matching with the second motion information.

According to at least one example embodiment of the present application, when motion information of another piece of user equipment is matched with motion information of at least one eye of a user collected by near-to-eye equipment, an interaction operation with the near-to-eye equipment and/or the other piece of user equipment is performed by one piece of user equipment, and a natural, portable and safe interaction method between pieces of equipment is provided.

DETAILED DESCRIPTION

The following further describes example embodiments of the present application in detail in combined with drawings (same numbers in the plural drawings denote same elements) and embodiments. The following embodiments intend to describe the present application rather than limiting a scope of the present application.

Those skilled in the art should understand that the terms such as "first" and "second" in the present application merely intend to differentiate different steps, equipment or modules, and represent neither any specific technical meaning nor a necessary logic sequence among them.

Figure 1:
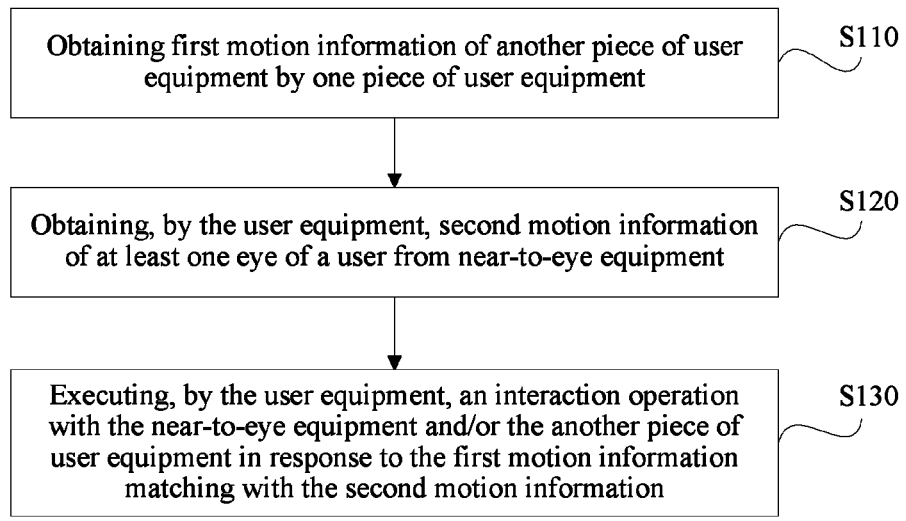
FIG. 1 is a flow chart of an interaction method between pieces of equipment according to an example embodiment of the present application.

As shown in FIG. 1, an embodiment of the present application provides an interaction method, comprising:

S110: obtaining first motion information of another piece of user equipment by one piece of user equipment;

S120: obtaining, by the user equipment, second motion information of at least one eye of a user from near-to-eye equipment; and S130: executing, by the user equipment, an interaction operation with the near-to-eye equipment and/or the other piece of user equipment in response to the first motion information matching with the second motion information.

For example, the user equipment provided in the present application serves as an execution main body of the present embodiment to execute S110-S130. Specifically, the user equipment comprises but is not limited to an intelligent watch, an intelligent ring, an intelligent cellphone, intelligent glasses, an intelligent helmet, a computer and a tablet computer.

The other piece of user equipment can be convenient-to-move portable equipment or other pieces of equipment with a movable part. For example, the other piece of user equipment comprises but is not limited to an intelligent watch, an intelligent ring, an intelligent cellphone, intelligent glasses and an intelligent helmet.

The near-to-eye equipment is equipment close to the at least one eye for use, for example, intelligent glasses, an intelligent helmet and the like, wherein the intelligent glasses comprises intelligent frame glasses and intelligent contact lenses.

According to at least one example embodiment of the present application, when motion information of another piece of user equipment is matched with motion information of at least one eye of a user collected by near-to-eye equipment, an interaction operation with the near-to-eye equipment and/or the other piece of user equipment is performed by one piece of user equipment, and a natural, portable and safe interaction method between pieces of equipment is provided.

Respective steps of the embodiment of the present application are further described by following example embodiments.

S110: obtaining first motion information of another piece of user equipment by one piece of user equipment.

In an example embodiment, the first motion information comprises: first motion feature information of the other piece of user equipment.

In an example embodiment, the first motion feature information for example can be one or more of pieces of information directly representing motion of the other piece of user equipment, such as a motion direction, a motion speed, a motion distance, motion time and a motion acceleration.

In another example embodiment, the first motion feature information can also be one or more of pieces of information indirectly representing motion of the other piece of user equipment. For example, in an example embodiment, the first motion feature information comprises inertia sensing feature information of the other piece of user equipment.

The inertia sensing feature information for example can be obtained by at least one inertia sensor of the other piece of user equipment. The at least one inertia sensor for example can comprise at least one of following:

an acceleration sensor, a gyroscope, a magnetic sensor, a gravity sensor and the like.

The first motion feature information for example can comprise the inertia sensing feature information collected by one of the at least one inertia sensor.

In another example embodiment, the first motion information further comprises: first timestamp information corresponding to the first motion feature information.

For example, in an example embodiment, the first motion feature information comprises: acceleration change information of the other piece of user equipment, and the first timestamp information can comprise: timestamps corresponding to all points or partial feature points in the acceleration change information. In an example embodiment, in order to enhance comparability with other pieces of equipment, and optionally, the first timestamp information is absolute timestamp information. For example, in an example embodiment, the other piece of user equipment is synchronized with time of a time server by network, and the absolute timestamp information is the time obtained by synchronizing with the time server.

In an example embodiment, optionally, the S110 comprises directly or indirectly obtaining the first motion feature information from the other piece of user equipment by the user equipment in a communicating manner.

In another example embodiment, optionally, the S110 comprises: obtaining the first motion information by the user equipment through at least one information collecting sensor. For example, in an example embodiment, the information collecting sensor is a camera, and configured for obtaining image information of the other piece of user equipment, thus further obtaining the first motion information of the other piece of user equipment by image analyzing.

In further possible implementation mode, optionally, the S110 comprises obtaining the first motion information from at least one piece of external equipment by the user equipment. For example, in an example embodiment, the first motion information is motion information of other equipment recorded by the other equipment which has the same motion state as the other piece of user equipment. For example, the user wears an intelligent watch and an intelligent bracelet on a wrist, wherein the intelligent bracelet is low in precision of a self inertia sensor or lack of a proper inertia sensor, therefore, the motion information of the intelligent watch strongly correlated to the intelligent bracelet in position can be obtained as the first motion information of the intelligent bracelet.

S120: obtaining, by the user equipment, second motion information of at least one eye of a user from near-to-eye equipment.

In an example embodiment, the second motion information can comprise: second motion feature information of at least one eye, wherein motion of the at least one eye can comprise: motion of the at least one eye in at least one eye socket or motion of the at least one eye along with a head of the user, therefore, in an example embodiment, the second motion feature information can comprise: the eye motion feature information of the at least one eye and the head motion feature information of the user.

In an example embodiment, optionally, the eye motion feature information comprises rotation information of eye balls in the eye sockets. In another example embodiment, optionally, the eye motion feature information can further comprise distance information of a gazing point of the at least one eye to the at least one eye.

The eye motion feature information for example can be obtained by an eye facing camera or an ocular electrical signal sensor facing the at least one eye on the near-to-eye equipment. The head motion feature information of the user can be obtained by an inertia sensor in a device worn by the head of the user (for example, the near-to-eye equipment, an earpiece and the like).

In another example embodiment, the second motion feature information comprises:

motion feature information of a gazing point of the at least one eye.

In an example embodiment, for example, the motion feature information of the gazing point can be obtained according to foregoing eye motion feature information and the head motion feature information.

In an example embodiment, optionally, the second motion information further comprises: second timestamp information corresponding to the second motion feature information.

Corresponding between the second timestamp information and the second motion feature information is similar to that between the first timestamp information and the first motion feature information and is not repeated herein.

In the present embodiment, the second timestamp information can be absolute timestamp information.

In an example embodiment, the step 120 comprises directly or indirectly obtaining the second motion information from the near-to-eye equipment in a communicating manner.

S130: executing, by the user equipment, an interaction operation with the near-to-eye equipment and/or the other piece of user equipment in response to the first motion information matching with the second motion information.

In the embodiment of the present application, the first motion information matching with the second motion information is that motion of the other piece of user equipment corresponding to the first motion information and the motion of a gazed object of the at least one eye corresponding to the second motion information are consistent. For example, when the other piece of user equipment moves rightward, the gazing point of the at least one eye also moves rightward; and when the other piece of user equipment moves close to the user, the gazing point of the at least one eye also moves close to the user.

According to foregoing description, in an example embodiment, the match of the motion feature information can represent consistency of the two motions. For example, the first motion information matching with the second motion information can comprise:

at least one first motion feature corresponding to the first motion feature information matches with the at least one second motion feature corresponding to the second motion feature information.

Quantities of the at least one first motion feature and the at least one second motion feature can be set as required. For example, when a safety level requirement is low, the quantity can be less, and when the safety level requirement is low, the quantity can be more.

A case of the first motion feature information comprising angle change information and the second motion feature information comprising the motion feature information of the eye motion information of the user is taken as an example to explain:

For example, the angle change information comprises a first motion feature: motion for a first duration at a first angular speed clockwise, and then motion for a second duration by a second angular speed counterclockwise.

The second motion feature information matched with the first motion feature information for example can comprise a second motion feature: the head of the user is motionless, and the eye balls move to a first direction for the first duration and then move to the opposite direction for the second duration.

In an example embodiment, the match condition between the first motion feature and the second motion feature can be learned by previous training.

In an example embodiment, when the first motion information comprises the first timestamp information and the second motion information comprises the second timestamp information, the first motion information matching with the second motion information further comprises:

according to the first timestamp information and the second timestamp information, first time corresponding to each first motion feature in the at least one first motion feature essentially coincides with second time corresponding to each matched second motion feature in the at least one second motion feature.

Still the implementation mode of the angle change information and the user eye motion information is taken as an example, here, the first time essentially coincides with the second time can be:

an initial point of the first duration corresponding to the angle change information same as an initial point of the first duration corresponding to the eye motion information; an initial point of the second duration corresponding to the angle change information same as an initial point of the second duration corresponding to the eye motion information.

Of course, in some example embodiments, due to reasons of equipment delay, the first time and the second time are not completely coincided and possibly have some deviation. In these implementation modes, when the deviation between the first time and the second time is in a set range, the two are considered to be coincided.

In the present embodiment, besides the match of the motion features, whether the first motion information and the second motion information are matched is determined in combination with the first timestamp information and the second timestamp information, causing the interaction between the user equipment and the near-to-eye equipment to be safer. For example, in an example embodiment, a user hopes that his own worn intelligent glasses is matched with his own worn intelligent bracelet, thus controls hands to make a motion and gaze the intelligent bracelet; in this process, another user in the vicinity possibly also controls his own hands to make a motion (the other user possibly learns the motion of the user), therefore, the second motion information of the user may be matched with the first motion information of the two intelligent bracelets, then which intelligent bracelet is the gazed intelligent bracelet of the user can be determined according to the match of the timestamps.

In an example embodiment, the interaction operation between the user equipment and the near-to-eye equipment can comprise:

an operation associated with the near-to-eye equipment.

In an example embodiment, the interaction operation with the other piece of user equipment and/or the near-to-eye equipment can comprise:

sending match associating information to another piece of user equipment and/or the near-to-eye equipment.

In an example embodiment, the match associating information can be match result information, and is for example match succeeding information in the present embodiment.

For example, the other piece of user equipment broadcasts a pairing request and the first motion information, and the near-to-eye equipment also broadcasts its equipment information and the first motion information. The user equipment obtains the pairing request and the first motion information of the other piece user equipment and the equipment information (for example communicating information) and the second motion information of the near-to-eye equipment by a communicating module. Through foregoing method, the user equipment matches the first motion information and the second motion information, and after the two is determined to be matched, the match succeeding information is sent to the near-to-eye equipment. The near-to-eye equipment obtains the pairing request from the other piece of user equipment and the match succeeding information from the user equipment by the communicating module, and then sends a pairing response to the other piece of user equipment to directly pair with the other piece of user equipment.

In another example embodiment, the match associating information can be information corresponding to a match succeeding result.

For example, the near-to-eye equipment broadcasts a pairing request and the second motion information, and the other piece of user equipment broadcasts its equipment information and the first motion information. The user equipment obtains the pairing request and the second motion information of the near-to-eye equipment and the equipment information and the first motion information of the other piece of user equipment by a communicating module. Through foregoing method, the user equipment matches the first motion information and the second motion information, and after the two is determined to be matched, for example, information corresponding to the match result, namely the pairing request of the near-to-eye equipment is sent to the other piece of user equipment. The other piece of user equipment obtains the pairing request and then sends a pairing response to directly pair with the other piece of user equipment.

It can be seen that in the present embodiment, the first motion information and the second motion information achieve an association code between pieces of equipment, and the match between two pieces of equipment is determined according to the match between the two without the need of manual input of the user and is very convenient. In addition, the near-to-eye equipment side adopts the motion information of the at least one eye as the second motion information, and introduction of attention of the user into an association process of the two pieces of equipment enables the association to be more accurate and safer. For example, when multiple pieces of user equipment exist in one scene, the user equipment viewed by the user can be accurately determined as the user equipment required to be associated with the near-to-eye equipment.

It can be seen from above description, the present embodiment is particular suitable for a case that when the information processing capacity of the other piece of user equipment and/or the near-to-eye equipment is poor, the first motion information and the second motion information are matched by the user equipment with higher processing capacity, thus assisting to finish the associating between the near-to-eye equipment and the other piece of user equipment.

In an example embodiment, the interaction operation with the other piece of user equipment and/or the near-to-eye equipment can comprise:

authorization authenticating operation on the near-to-eye equipment and/or the other piece of user equipment.

In an example embodiment, the authorization authenticating operation on the near-to-eye equipment and/or the other piece of user equipment comprises: sending an authorization authenticating information to the near-to-eye equipment and/or the other piece of user equipment.

The authorization authenticating information can be identity authentication information, permission information and the like.

In one possible scene, the user needs to perform electronic paying, a safety module associated with the electronic paying is in a cellphone (as the foregoing user equipment) of the user, the user module can send paying authenticating information (for example a token code) by only confirming an identity of the user. For facilitating operation (for example, the cellphone in a bag of the user who hope not to take out the cellphone), the user hopes to use an intelligent bracelet worn on the wrist (as foregoing another piece of user equipment) for paying. The user further wears a pair of intelligent glasses with an identity recognition module (as foregoing near-to-eye equipment), and the identity recognition module for example can be an iris image collecting module.

Then the user can shake and gaze the intelligent bracelet, the intelligent bracelet outwards sends corresponding first motion information and bracelet equipment information, the intelligent glasses outwards sends corresponding second motion information and identity recognition information (for example a collected iris image or a recognition result on the iris image), and the cellphone obtains the first motion information, the bracelet equipment information, the second motion information and the identity recognition information. By the method of the embodiment of the present application, the first motion information and the second motion information are determined to be matched, and the identity recognition information can be confirmed by the safety module, and then the cellphone can send paying authenticating information to the intelligent bracelet according to the bracelet equipment information. At the moment, the user can perform corresponding paying by using the intelligent bracelet.

It can be seen from the present embodiment that since the near-to-eye equipment can conveniently safely perform user authenticating by an iris detection manner in real time, the near-to-eye equipment can be regarded as a piece of equipment safer than other pieces of common user equipment. Through the method of the present embodiment, the permission of the near-to-eye equipment is authenticated to the user equipment in such way, thus causing the use of the user equipment to be very safe. The method is particularly suitable for use in occasions with high safety levels.

Those skilled in the art can know that besides foregoing interaction operation with the near-to-eye equipment and/or the other piece of user equipment, other interaction operations can also be included and are repeated herein.

Those skilled in the art can understand that in the method of example embodiments of the present application, numbers of the steps do not indicate an execution sequence, the execution sequence of all steps is determined by functions and internal logic thereof and does not limit the implementation process of example embodiments of the present application in any way.

Figure 2:
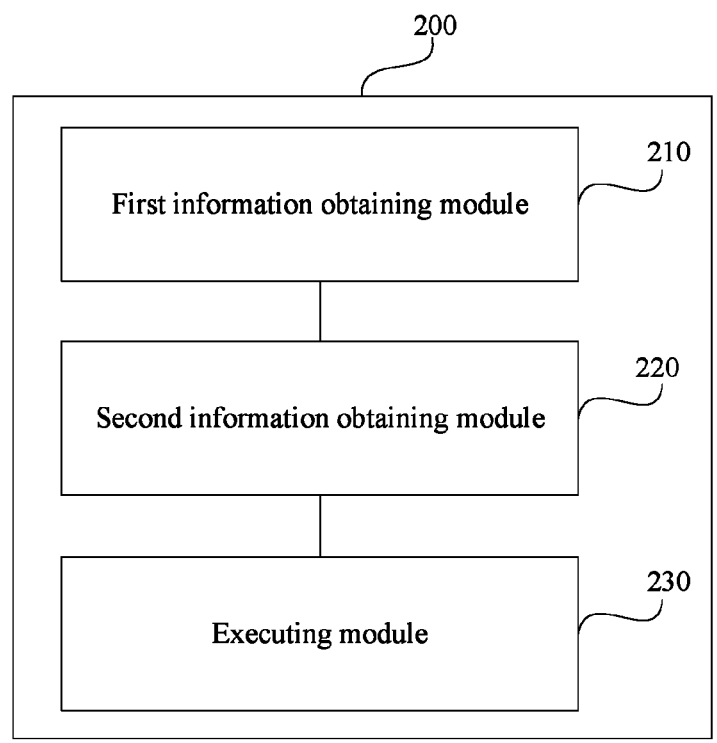
FIG. 2 is a structural schematic block diagram of user equipment according to an example embodiment of the present application.

As shown in FIG. 2, an example embodiment of the present application provides user equipment 200, comprising:

a first information obtaining module 210, configured for obtaining first motion information of another piece of user equipment;

a second information obtaining module 220, configured for obtaining second motion information of at least one eye of a user from a piece of near-to-eye equipment; and an executing module 230, configured for executing an interaction operation with the near-to-eye equipment and/or the other piece of user equipment in response to the first motion information matching with the second motion information.

According to at least one example embodiment of the present application, when motion information of another piece of user equipment is matched with motion information of at least one eye of a user collected by near-to-eye equipment, an interaction operation with the near-to-eye equipment and/or the other piece of user equipment is performed by one piece of user equipment, and a natural, portable and safe interaction method between pieces of equipment is provided.

The user equipment of the embodiment of the present application is further described by following example embodiments.

In an example embodiment, the first motion information comprises: first motion feature information of the other piece of user equipment.

In an example embodiment, the first motion feature information for example can be one or more of pieces of information directly representing motion of the other piece of user equipment, such as a motion direction, a motion speed, a motion distance, motion time and a motion acceleration.

In another example embodiment, the first motion feature information can also be one or more of pieces of information indirectly representing motion of the other piece of user equipment. For example, in an example embodiment, the first motion feature information comprises inertia sensing feature information of the other piece of user equipment.

The inertia sensing feature information for example can be obtained by at least one inertia sensor of the other piece of user equipment. The at least one inertia sensor for example can comprise at least one of following:

an acceleration sensor, a gyroscope, a magnetic sensor, a gravity sensor and the like.

In an example embodiment, the first information obtaining module 210 can comprise:

a first communicating unit, configured for obtaining the first motion information from at least one piece of external equipment.

In an example embodiment, the at least one piece of external equipment is the other piece of user equipment.

In other example embodiments, the at least one piece of external equipment can be at least one other pieces of external equipment recorded in the embodiment as shown in FIG. 1.

In another example embodiment, the first information obtaining module 210 can comprise an information collecting unit configured for collecting the first motion information.

For example, in an example embodiment, the information collecting sensor is a camera, which is configured for obtaining image information of the other piece of user equipment and further obtaining the first motion information of the other user equipment by image analyzing.

In an example embodiment, the second motion information can comprise: second motion feature information of at least one eye, wherein motion of the at least one eye can comprise: motion of the at least one eye in at least one eye socket or motion of the at least one eye along with a head of the user, therefore, in an example embodiment, the second motion feature information can comprise: the eye motion feature information of the at least one eye and the head motion feature information of the user.

In another example embodiment, the second motion feature information comprises:

motion feature information of a gazing point of the at least one eye.

In an example embodiment, for example, the motion feature information of the gazing point can be obtained according to foregoing eye motion feature information and the head motion feature information.

In an example embodiment, optionally, the second motion information further comprises: second timestamp information corresponding to the second motion feature information.

In an example embodiment, the second information obtaining module 220 can comprise:

a second communicating unit, configured for obtaining the second motion information from at least one piece of external equipment.

The at least one piece of external equipment for example can comprise the near-to-eye equipment.

Figure 3A:
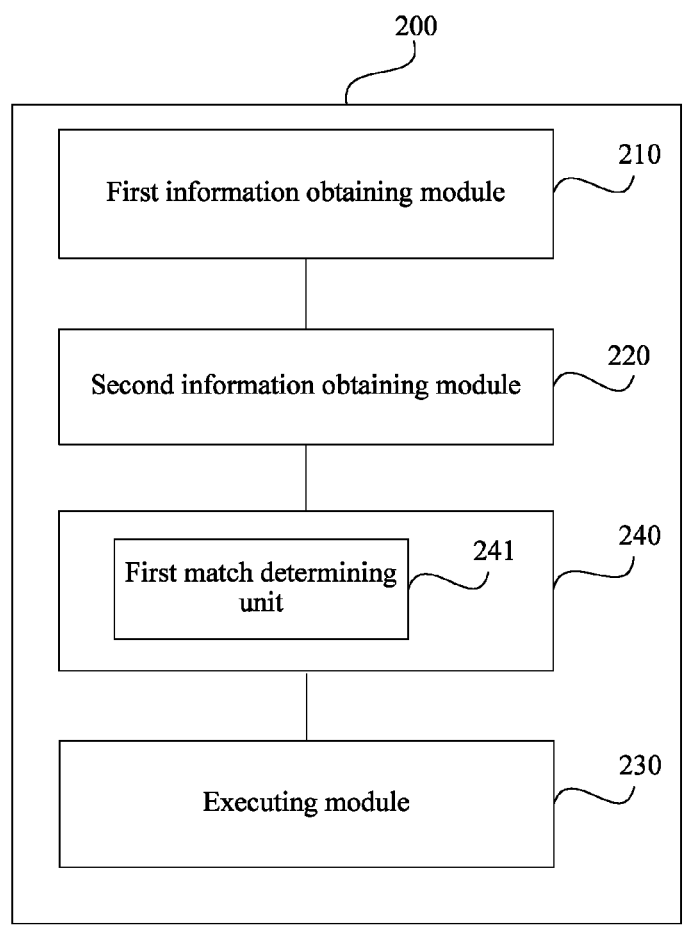
FIG. 3a-FIG. 3d are structural schematic block diagrams of four pieces of user equipment according to an example embodiment of the present application.

In an example embodiment, as shown in FIG. 3a, the user equipment 200 further comprises:

a match determining module 240, configured for determining whether the first motion information is matched with the second motion information.

In the embodiment of the present application, the first motion information matching with the second motion information is that motion of the user equipment corresponding to the first motion information and the motion of a gazed object of the at least one eye corresponding to the second motion information are consistent.

In an example embodiment, as shown in FIG. 3a, the match determining module 240 comprises:

a first match determining unit 241, configured for determining whether the at least one first motion feature corresponding to the first motion feature information and the at least one second motion feature corresponding to the second motion feature information are matched, wherein, at least when the at least one first motion feature and the at least one second motion feature are matched, the first motion information and the second motion information are matched.

Figure 3B:
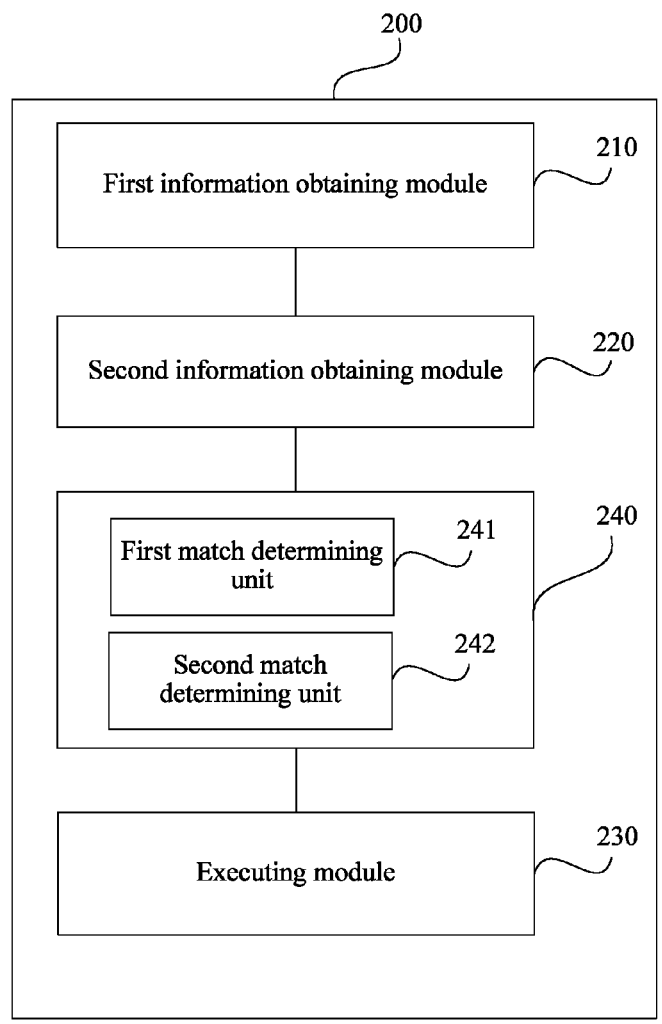

In an example embodiment, when the first motion information comprises the first timestamp information and the second motion information comprises the second timestamp information, as shown in FIG. 3b, the match determining module 240 further comprises:

a second match determining unit 242, configured for, according to the first timestamp information and the second timestamp information, determining whether first time corresponding to each first motion feature in the at least one first motion feature is essentially coincided with second time corresponding to each matched second motion feature in the at least one second feature, wherein when the at least one motion feature matches with the at least one second motion feature as well as the first time and the second time are essentially coincided, the first motion information and the second motion information are matched.

In the present embodiment, besides the match of the motion features, whether the first motion information and the second motion information are matched is determined in combination with the match between the first timestamp information and the second timestamp information, thus enabling the interaction between the user equipment and the near-to-eye equipment to be safer.

Figure 3C:
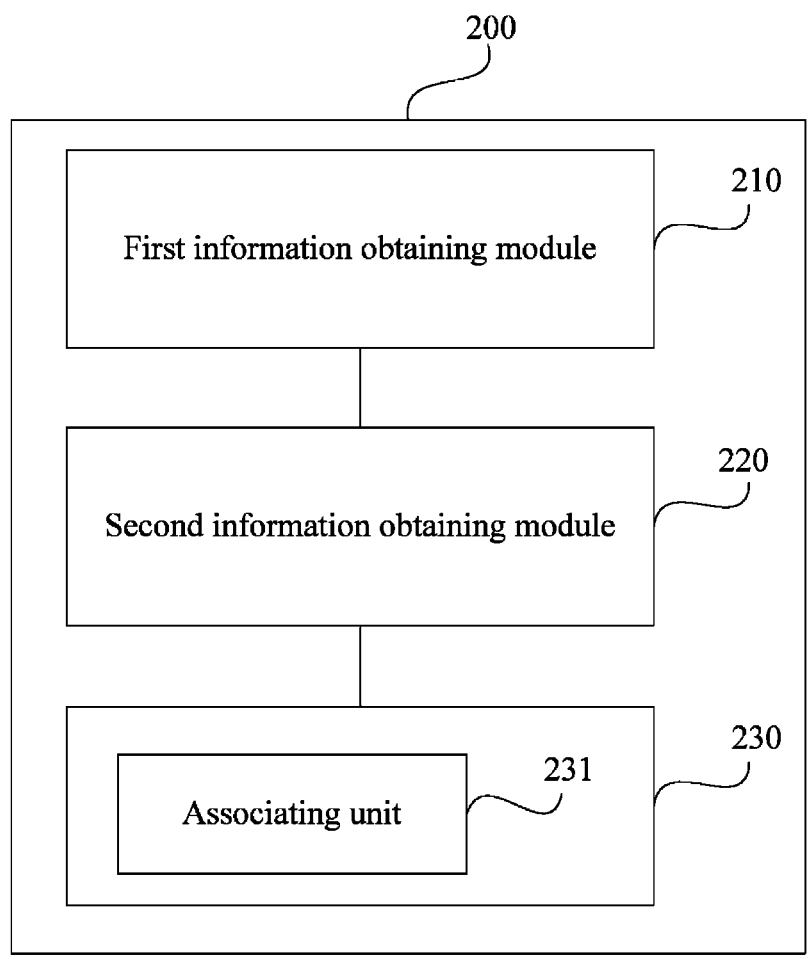

As shown in FIG. 3c, in an example embodiment, optionally, the executing module 230 can comprise:

an associating unit 231, configured for sending match associating information to the near-to-eye equipment and/or the other piece of user equipment.

In an example embodiment, the match associating information can be match result information, and is for example match succeeding information in the present embodiment.

In another example embodiment, the match associating information can be information corresponding to a match succeeding result.

It can be seen that in the present embodiment, the first motion information and the second motion information achieve an associating code between pieces of equipment, and the match between two pieces of equipment is determined according to the match between the two without the need of manual input of the user and is very convenient. In addition, the near-to-eye equipment side adopts the motion information of the at least one eye as the second motion information, and introduction of attention of the user into an association process of the two pieces of equipment enables the association to be more accurate and safer.

Figure 3D:
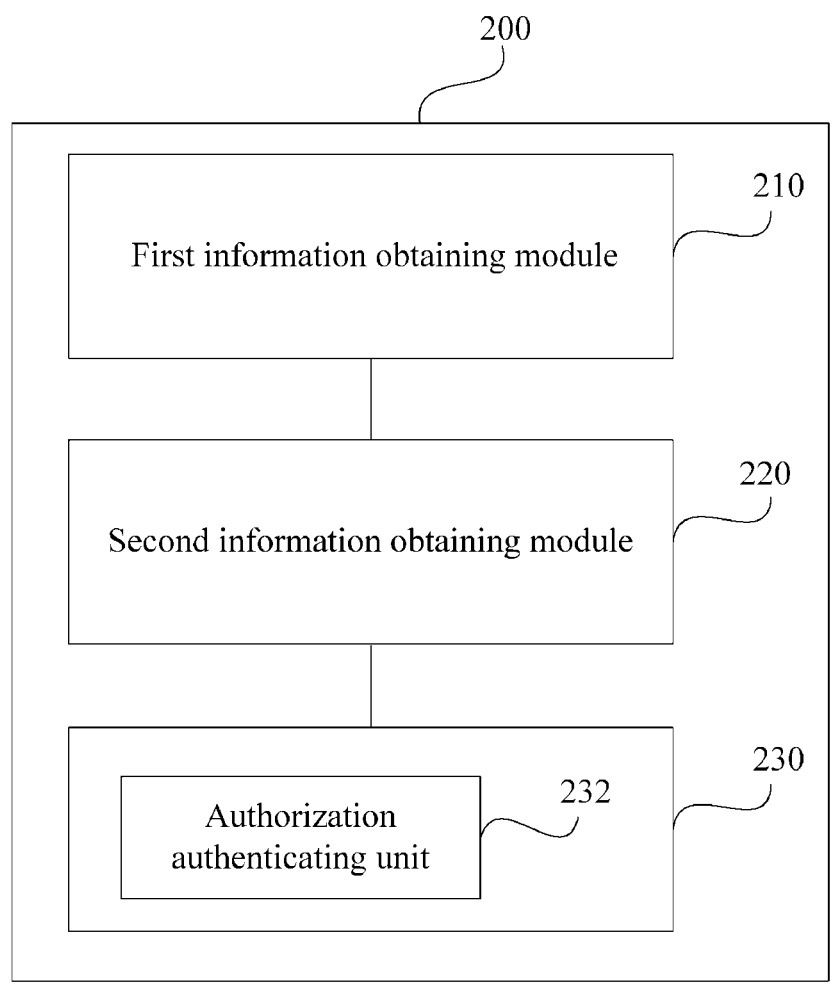

As shown in FIG. 3d, in an example embodiment, optionally, the executing module 230 can comprise:

an authorization authenticating unit 232, configured for performing authorization authenticating operation on the near-to-eye equipment.

Further functions of respective modules and units of the embodiment of the present application refer to corresponding description as shown in FIG. 1 and are not repeated herein.

Figure 4:
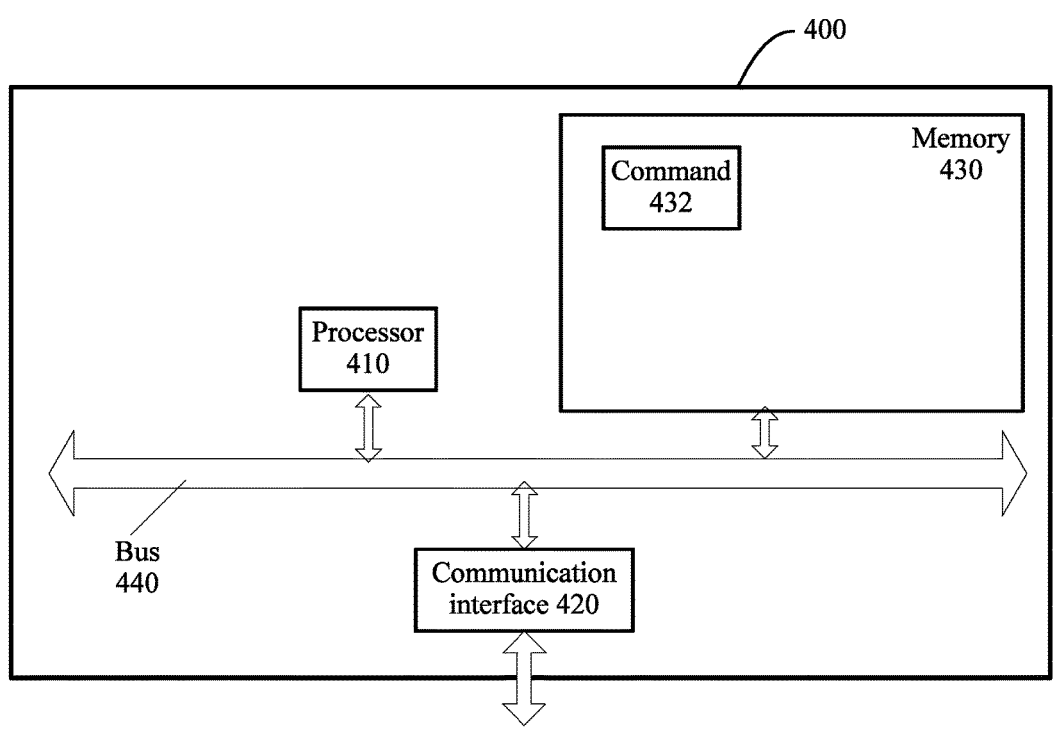
FIG. 4 is a structural schematic block diagram of one piece of user equipment according to an example embodiment of the present application.

FIG. 4 is a structural schematic diagram of user equipment 400 according to an embodiment of the present application, which does not limit specific implementation of the user equipment 400. As shown in FIG. 4, the user equipment 400 comprises:

a processor 410, a communication interface 420, a memory 430 and a communication bus 440, wherein, the processor 410, the communication interface 420 and the memory 430 communicate with one another by the communication bus 440.

The communication interface 420 is configured for communication with a network element such as a client end.

The processor 410 is configured for executing a command 432 and specifically executing related steps in the embodiments of foregoing method.

Specifically, the command 432 can comprise a computer operation command.

The processor 410 can be a CPU or an ASIC (Application Specific Integrated Circuit), or is configured to be one or more integrated circuits to execute the embodiments of the present application.

The memory 430 is configured for storing the command 432. The memory 430 possibly contains a high speed Ram memory and possibly further comprises a non-volatile memory, for example, at least one disk memory. The command 432 is specifically configured for enabling the user equipment 400 to execute following steps:

obtaining first motion information of another piece of user equipment;

obtaining second motion information of at least one eye of a user from near-to-eye equipment; and executing an interaction operation with the near-to-eye equipment and/or the other piece of user equipment in response to the first motion information matching with the second motion information.

The implementation of the steps in the command 432 refers to the corresponding descriptions of corresponding steps and units in the foregoing embodiments, which are not repeated herein. It may be clearly understood by a person skilled in the art that, for the purpose of convenient and brief description, reference may be made to the description of corresponding procedures in the foregoing method embodiments for detailed working procedures of the foregoing devices and modules, and details are not repeated herein.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing storage medium comprises a USB flash drive, a removable hard disk, a read-only memory (ROM), a random access memory (RAM), a diskette or a compact disk that can be configured for storing a program code.

The above example embodiments are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
obtaining, by a first piece of user equipment comprising a processor, first motion information of a second piece of user equipment;
obtaining, by the first piece of the user equipment, second motion information of an eye associated with a user identity from a near-to-eye equipment; and
executing, by the first piece of the user equipment, an interaction operation with at least one of the near-to-eye equipment or the second piece of user equipment in response to the first motion information being determined to match the second motion information, wherein the first motion information being determined to match the second motion information is based on an actual motion of the second piece of user equipment and a determined motion for an object on which the eye is focused in a manner that is determined to be consistent.

2. The method of claim 1, wherein:
the first motion information comprises first motion feature information of the second piece of user equipment, and
the second motion information comprises second motion feature information of the eye.

3. The method of claim 2, wherein the first motion feature information comprises inertia sensing feature information of the second piece of user equipment.

4. The method of claim 2, wherein the second motion feature information comprises eye motion feature information of the eye and head motion feature information of the user.

5. The method of claim 2, wherein the second motion feature information comprises motion feature information of a gazing point of the eye.

6. The method of claim 2, wherein the first motion information being determined to match the second motion information comprises a first motion feature information corresponding to the first motion feature information being determined to match the second motion feature corresponding to the second motion feature information.

7. The method of claim 6, wherein:
the first motion information further comprises first timestamp information corresponding to the first motion feature information, and
the second motion information further comprises second timestamp information corresponding to the second motion feature information.

8. The method of claim 7, wherein the first motion information being determined to match the second motion information further comprises:
according to the first timestamp information and the second timestamp information, a first time corresponding to the first motion feature substantially coincides with a second time corresponding to the second motion feature.

9. The method of claim 1, wherein an interaction operation with at least one of the near-to-eye equipment or the second piece of user equipment comprises:
sending match associating information to at least one of the second piece of user equipment or the near-to-eye equipment.

10. The method of claim 1, wherein the interaction operation with at least one of the near-to-eye equipment or the second piece of user equipment comprises:
authorization authenticating operation on at least one of the near-to-eye equipment or the second piece of user equipment.

11. A user equipment, comprising:
a memory that stores executable modules; and
a processor, coupled to the memory, that executes or facilitates execution of the executable modules, the executable modules comprising:
a first information obtaining module configured to obtain first motion information of another piece of user equipment;
a second information obtaining module configured to obtain second motion information of at least one eye of a user from near-to-eye equipment; and
an executing module configured to execute an interaction operation with the near-to-eye equipment or the other piece of user equipment in response to the first motion information matching with the second motion information, wherein the first motion information matching with the second motion information is based on a motion of the other piece of user equipment and a determined motion for an object that is at a focus of the at least one eye being determined to be consistent.

12. The user equipment of claim 11, wherein the executable modules further comprise:
a match determining module configured to determine whether the first motion information is matched with the second motion information.

13. The user equipment of claim 12, wherein:
the first motion information comprises first motion feature information of the other piece user equipment,
the second motion information comprises second motion feature information of the at least one eye, and
the match determining module comprises a first match determining unit configured to determine whether the at least one first motion feature corresponding to the first motion feature information and the at least one second motion feature corresponding to the second motion feature information are matched.

14. The user equipment of claim 13, wherein the first motion feature information comprises inertia sensing feature information of the other piece of user equipment.

15. The user equipment of claim 13, wherein the second motion feature information comprises eye motion feature information of the at least one eye and head motion feature information of the user.

16. The user equipment of claim 13, wherein the second motion feature information comprises motion feature information of a gazing point of the at least one eye.

17. The user equipment of claim 13, wherein:
the first motion information further comprises first timestamp information corresponding to the first motion feature information,
the second motion information further comprises second timestamp information corresponding to the second motion feature information, and
the match determining module further comprises a second match determining unit configured to, according to the first timestamp information and the second timestamp information, determine whether at least one first time corresponding to each first motion feature in the at least one first motion feature is essentially coincided with at least one second time corresponding to each matched second motion feature in the at least one second feature.

18. The user equipment of claim 11, wherein the executing module comprises an associating unit configured to send match associating information to the other piece of user equipment or the near-to-eye equipment.

19. The user equipment of claim 11, wherein the executing module comprises an authorization authenticating unit configured to perform an authorization authenticating operation on the near-to-eye equipment or the other piece of user equipment.

20. A user equipment, comprising:
a memory configured to store a command;
a processor configured to execute the command of the memory, wherein the command enables the processor to execute operations, comprising:
obtaining first motion information of another piece of user equipment;
obtaining second motion information of at least one eye of a user from near-to-eye equipment; and
executing an interaction operation with at least one of the near-to-eye equipment or the other piece of user equipment in response to the first motion information being determined to match the second motion information, wherein the first motion information being determined to match the second motion information is that the motion of the other piece of user equipment corresponding to the first motion information and the motion of a gazed object of the at least one eye corresponding to the second motion information are consistent.

* * * * *